United States Patent
Debnath et al.

(10) Patent No.: US 10,990,616 B2
(45) Date of Patent: Apr. 27, 2021

(54) FAST PATTERN DISCOVERY FOR LOG ANALYTICS

(71) Applicant: NEC Laboratories America, Inc., Princeton, NJ (US)

(72) Inventors: Biplob Debnath, Princeton, NJ (US); Jianwu Xu, Lawrenceville, NJ (US); Hui Zhang, Princeton Junction, NJ (US); Guofei Jiang, Princeton, NJ (US); Hossein Hamooni, Albuquerque, NM (US)

(73) Assignee: NEC CORPORATION

( * ) Notice: Subject to any disclaimer, the term of this patent is extended or adjusted under 35 U.S.C. 154(b) by 883 days.

(21) Appl. No.: 15/351,452

(22) Filed: Nov. 15, 2016

(65) Prior Publication Data

US 2017/0236023 A1    Aug. 17, 2017

Related U.S. Application Data (60) Provisional application No. 62/256,212, filed on Nov. 17, 2015.

(51) Int. Cl.
*G06F 11/34* (2006.01)
*G06F 16/31* (2019.01)
*G06F 17/40* (2006.01)
*G06K 9/46* (2006.01)

(52) U.S. Cl.
CPC ............ *G06F 16/322* (2019.01); *G06F 11/34* (2013.01); *G06F 17/40* (2013.01); *G06K 9/4604* (2013.01)

(58) Field of Classification Search
CPC ............................. G06K 9/4604; G06F 16/322

USPC ........................................................ 707/737
See application file for complete search history.

(56) References Cited

U.S. PATENT DOCUMENTS

| | | | | |
|---|---|---|---|---|
| 7,106,897 B1* | 9/2006 | McIntyre | ................. | G06K 9/48 |
| | | | | 382/145 |
| 7,480,640 B1* | 1/2009 | Elad | ...................... | G06Q 10/10 |
| | | | | 706/14 |
| 2004/0037474 A1* | 2/2004 | Happel | .................. | G06K 9/481 |
| | | | | 382/280 |
| 2005/0165566 A1* | 7/2005 | Happel | ............. | G06K 9/00523 |
| | | | | 702/66 |
| 2006/0184529 A1* | 8/2006 | Berg | .................. | G06F 11/0709 |
| 2009/0077383 A1* | 3/2009 | de Monseignat | ... | H04L 63/0823 |
| | | | | 713/175 |
| 2009/0228445 A1* | 9/2009 | Gangal | ................. | G06F 16/285 |
| 2009/0254572 A1* | 10/2009 | Redlich | .................. | G06Q 10/06 |
| 2010/0293134 A1* | 11/2010 | Von Sydow | ........... | G06N 7/005 |
| | | | | 706/55 |
| 2011/0035390 A1* | 2/2011 | Whitehouse | ........ | H04L 63/1425 |
| | | | | 707/755 |
| 2011/0173142 A1* | 7/2011 | Dasgupta | ............... | G06N 20/00 |
| | | | | 706/12 |

(Continued)

*Primary Examiner* — Mark E Hershley
(74) *Attorney, Agent, or Firm* — Joseph Kolodka (57) ABSTRACT

Systems and methods are disclosed for parsing logs from arbitrary or unknown systems or applications by capturing heterogeneous logs from the arbitrary or unknown systems or applications; generating one pattern for every unique log message; building a pattern hierarchy tree by grouping patterns based on similarity metrics, and for every group it generates one pattern by combing all constituting patterns of that group; and selecting a set of patterns from the pattern hierarchy tree.

10 Claims, 6 Drawing Sheets

(56) References Cited

U.S. PATENT DOCUMENTS

| | | | |
|---|---|---|---|
| 2013/0268260 A1* | 10/2013 | Lundberg | G06F 17/28 704/8 |
| 2014/0075004 A1* | 3/2014 | Van Dusen | H04L 41/04 709/223 |
| 2015/0244828 A1* | 8/2015 | Heydon | H04L 43/065 709/232 |
| 2016/0196324 A1* | 7/2016 | Haviv | G06F 16/122 707/626 |
| 2016/0226985 A1* | 8/2016 | Yoon | H04L 67/2861 |
| 2016/0253679 A1* | 9/2016 | Venkatraman | G06Q 30/0185 705/310 |
| 2018/0005127 A1* | 1/2018 | Akyamac | G06N 5/046 |
| 2018/0027006 A1* | 1/2018 | Zimmermann | H04L 63/0245 726/11 |

* cited by examiner

FAST PATTERN DISCOVERY FOR LOG ANALYTICS

This application claims priority to Provisional App. 62/256,212 filed Nov. 17, 2015, the content of which is incorporated by reference.

The present invention is related to systems for log analytics for applications, sensors or instruments.

Humans communicate through natural language, machines communicates with human beings and other devices through log messages. Numerous log messages are generated every day by social networks, banking systems, health care systems, smart cities, IoT devices etc. Administrators are interested in analyzing these log messages in order to predict future events, detect anomalies or debug performance problems. To analyze a log, first users need to parse it to understand its content. One traditional way to parse the logs is to come up with some regular expressions (regex) manually. This is really hard to because logs have different formats. There is no prior knowledge about how many unique formats exist in the logs. In addition, Web server and IoT devices generate millions of logs every day. To keep up with this rate, the log parser should be able to handle millions of logs in few hours.

Conventional systems require various parameters to be set by the user of the system. This is troublesome since the user may not have any idea about the best value for these parameters. In addition, if the user sets some values for these parameters and run the whole log analyzer, he may not be satisfied about the final set of patterns. The only choice he has in such a situation is to set different values for the parameters and run the whole pipeline again. Further, due to slow performance in conventional systems, each round of running takes a long time, therefore, no flexibility is provided for the usability from this point of view.

SUMMARY

Systems and methods are disclosed for parsing logs from arbitrary or unknown systems or applications by capturing heterogeneous logs from the arbitrary or unknown systems or applications; generating one pattern for every unique log message; building a pattern hierarchy tree by grouping patterns based on similarity metrics, and for every group it generates one pattern by combing all constituting patterns of that group; and selecting a set of patterns from the pattern hierarchy tree.

Advantages of the system may include one or more of the following. The system does not need any input parameters from a user. A fast and memory efficient clustering process is provided which is specially designed for logs generated by computer programs. A fast pattern recognition process is provided that is specially designed to work with logs generated by computer programs. The iterative process combines clustering and pattern recognition algorithms and generates a hierarchy of patterns. From this hierarchy a user can select a set of patterns to meet her specific use-cases. The system automatically detects anomalies in heterogeneous log sources generated by modern day devices. The system can process logs generated by sensors, computer software, or internet-of things. The system does not need any human input or previous gold standard of common patterns. The system is completely automated, and relies on unsupervised machine learning algorithms to alert the users of any anomalies in the system. Monitoring and triggering alerts is an essential "first-attack" mechanism to quickly capture problems in large-scale production software. Furthermore it is important, to localize the symptom, and its potential causes as soon as possible. The system provides a platform that can plug-in data analytics and models and can push alerts, their potential causes using advanced machine-learning techniques. The system can run on any unmodified logs, without prior knowledge of the structure.

DESCRIPTION

Figure 1:
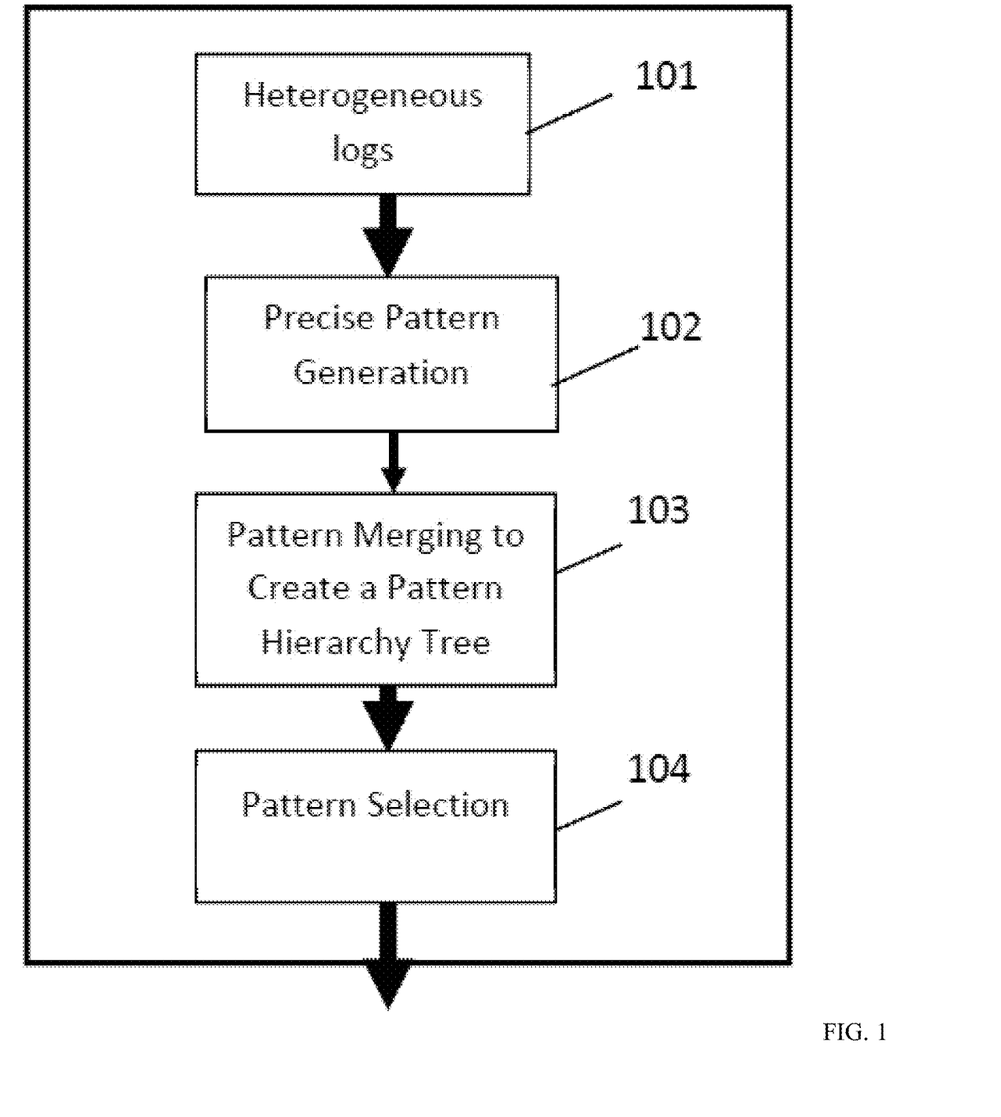
FIG. 1 shows an exemplary pattern discovery process.

FIG. 1 shows an exemplary pattern discovery process. The system addresses the issue of efficiently generating a set of regular expressions from set heterogeneous logs so that all logs can be correctly parsed. In this invention, each regular expression is denoted as a "pattern".

Turning now to FIG. 1, in 101, the system performs heterogeneous log collection. This step takes heterogeneous logs from arbitrary/unknown systems or applications. Logs contain unstructured text content with one or multiple fields. They may also contain timestamps. Next, in 102, a precise pattern generation is done. This step generates one pattern for every unique log message. In 103, the process builds a pattern hierarchy Tree. This step groups patterns from 102 based on similarity metrics, and for every group it generates one pattern by combing all constituting patterns of that group. This step starts with a small similarity distance threshold, and gradually increases it so that multiple patterns can be merged together. For every similarity distance threshold it generates a set of patterns, which consequently merged to generate fewer patterns. It stops when there is only one single pattern left. Thus, it creates a pattern tree. In this tree, leaf level contains all precise patterns, while root level contains only one single pattern. All intermediate levels contain patterns which are built by merging multiple patterns from its lower levels based on similarity distance.

Next, in 104, the system performs pattern selection. In this step, a set of patterns are selected from the pattern tree generated in 103. In the pattern-tree, leaf level patterns do not contain any wildcards, while upper-level patterns may contain wildcards. Usually wildcards incur some computational overhead when processing logs. In addition, fewer patterns are usually better as they reduce computational overhead. Clearly, there is a tradeoff in terms of computational overhead between wildcards and number of patterns. In step 104, the user can choose a set of patterns which satisfies predetermined needs.

This system of FIG. 1 addresses both scalability and flexibility problem with a completely new approach. It handles much more number of logs in a short time without consuming much memory, and if the user is not satisfied with the final set of patterns, he does not need to run the whole system again. In addition, the system does not need any parameters to generate patterns.

The system leverages a special property of the logs generated by computing devices. It assumes that the logs are not like random sentences from a story book. They are generated by a computer program. There are some specific lines of code in each application source code that produce logs; therefore all of them are generated by a set of specific formats. This means that all the logs generated by the same format in the source code are highly similar to each other. If we assume that the best clustering of the logs would be to put all the logs corresponded to a pattern in the same cluster, the similarity distance between all the logs inside a cluster is very small compared to the distance between logs across the clusters. So, these are very dense clusters in the space. This property of logs helps us design a simple and efficient process for clustering and pattern recognition.

Figure 2:
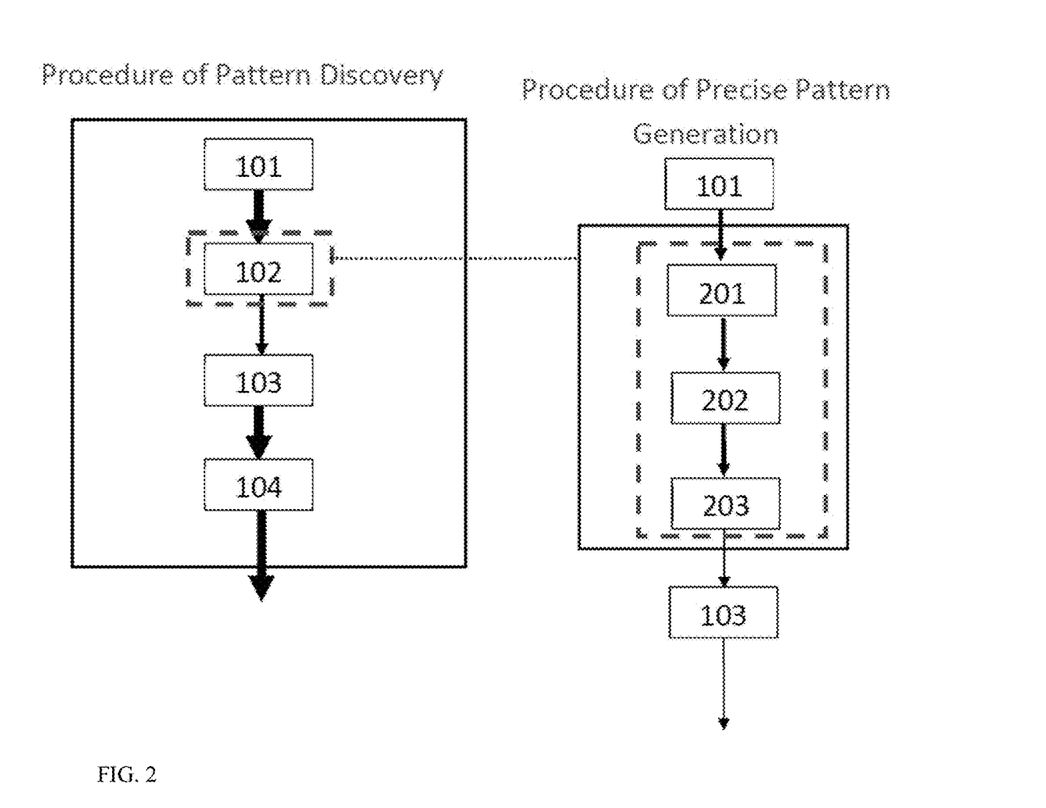
FIG. 2 shows details of an exemplary precise pattern generation process.
Figure 3:
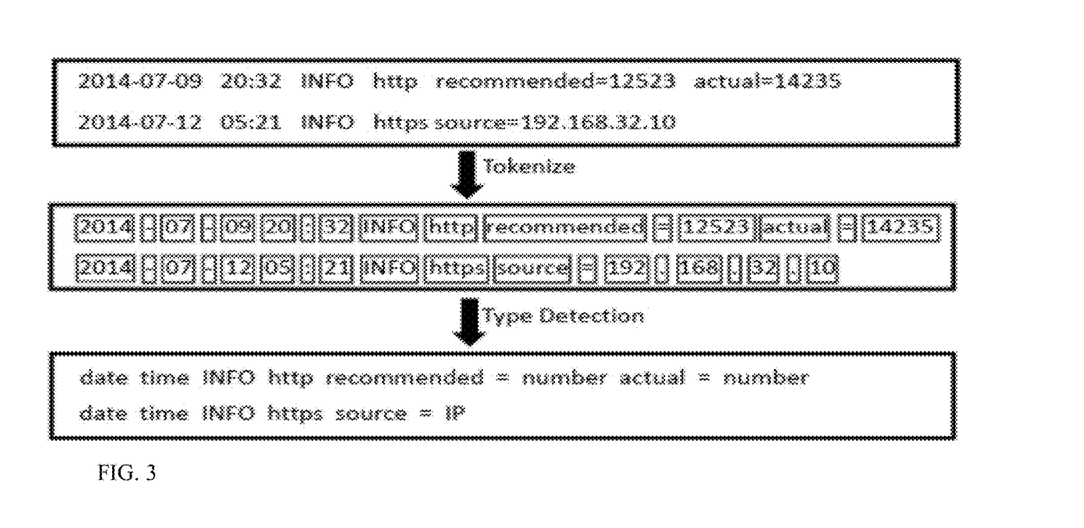
FIG. 3 shows an illustration of how the process tokenizes a log message.

FIG. 2 shows details of an exemplary precise pattern generation process. In 201, log tokenization is done. Taking arbitrary heterogeneous logs (from 101), a tokenization is processed in order to generate semantically meaningful tokens from logs. The process splits each incoming log based on a set of delimiters (i.e, space, comma etc.). The process then detects a set of pre-defined data-types such as date, time, IP and number and replaces the real value of these fields with the name of the field. For instance, the system replaces 2014-07-09 with "date", 192.168.32.10 with "IP", and "12523" by "number", and so on. This set of pre-defined types can be changed based on user's requirements because he may care about the real contents of a certain type. FIG. 3 shows an illustration of how the process tokenizes a log message.

In 202, the process generates a compact-signature for a log by combining all of its tokens from 201 into one single word, and applying a function which generates a unique numeric value for every unique word. In 203, the process determines the uniqueness of a compact-signature. The process maintains an index for all unique compact-signatures. Every index entry contains compact-signature as "key" and its associated metadata as "value". Metadata contains log tokens and a counter. Later the process generates patterns for logs from these tokens. For every incoming log, the system looks-up this index using its compact-signature. If a match is found, it means that the system has already found a log covering this incoming log, so the process simply discards this log and increases the counter by one. Otherwise, the system stores the compact-signature with associated token in an index, and sets the counter value to one. The memory requirement for generating precise patterns is that space needed for storing this index. In addition, the index size does not depend on the total number of log processed; rather it depends on the unique number of compact-signatures.

Figure 4:
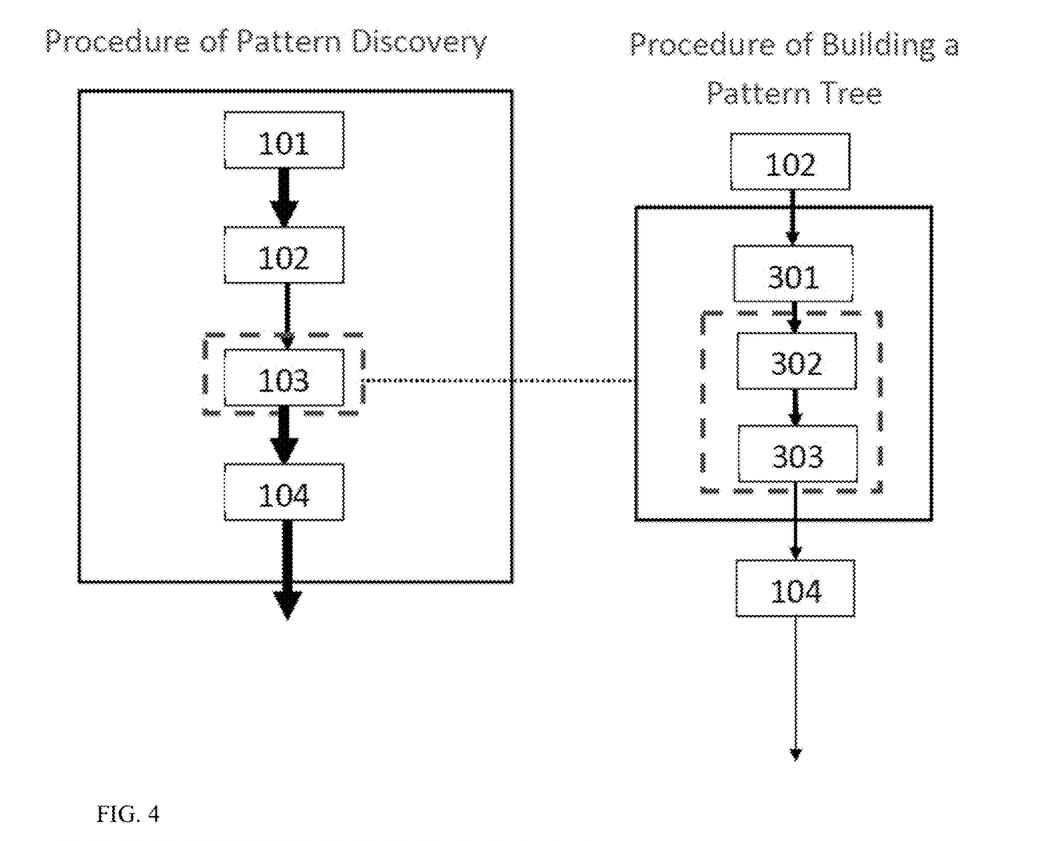
FIG. 4 shows the details of an exemplary pattern-tree building process.

FIG. 4 shows the details of an exemplary pattern-tree building process. In 301, the process builds a cluster for all unique compact-signatures generated in 203 by using their log tokens. Each set of log tokens represents a particular log. From now on, "log" means corresponding tokens generated in 201. Logs generated by the same format have a very small similarity distance (zero in many cases) and logs generated by different formats usually have larger distances. The property enables a very fast and memory-efficient clustering methodology.

Next, in 301.a, the process finds dense clusters. The process starts from the first log and process all the logs one by one till it gets to the last one and all the dense clusters will be created during this process. For each new log to be processed, the process compares it to a set of representative logs and finds one representative log which has a distance less than or equal to MaxDist to the new log. MaxDist is an internal parameter. Initially, it is set to a very small value (i.e., 0.0000001). Distance estimation formula is explained in step 301.d. If no representative is found, it means the log being processed is not similar to any of the clusters seen so far and the process needs to create a new cluster. The process creates a new cluster, sets this log as the representative for this new cluster, creates a member list and adds a new log to the member list, and sets the new cluster's counter value to the new log's counter value (from 103). If a representative is found, a new log is added to its members list, as well as the new log's counter value (from 103) to the cluster's current counter value.

In 301.b, the process can improve speed using an Early Abandoning Technique. Although 301.a is fast, an additional speedup technique can make it even faster. Early abandoning is a useful technique to speed up similarity search under Euclidean Distance. To find the dense clusters, the process compares the distance between a new log and a representative log with MaxDist to see if it can put the new log in to that cluster. Since the distance between two logs is calculated like the Euclidean Distance, early abandoning techniques are applied. By comparing two given logs token by token, if the process detects that the distance has already exceeded the threshold, then there is no need to calculate the distance completely because these two logs are not in MaxDist radius of each other. Since the number of tokens in a log can be large, this technique helps to avoid unnecessary calculation significantly.

In 301.c, the process performs log distance determination. The distance between two logs P and Q is determined by the following formula:

$$Dist(P, Q) = 1 - Sim(P, Q)$$

$$Sim(P, Q) = \sum_{i=1}^{Min(len(P), len(Q))} \frac{Score(P_i, Q_i)}{Max(len(P), len(Q))}$$

$$Score(x, y) = \begin{cases} k_1 & \text{if } x = y \\ 0 & \text{otherwise} \end{cases}$$

where $P_i$ is the i-th token of log P and len(P) is the number of tokens of log P, while $Q_i$ is the i-th token of log Q and len(Q) is the number of tokens of log Q. $k_1$ is a tunable parameters. By default $k_1$ is set to 1, but it can be changed based on the user's requirement.

Figure 5:
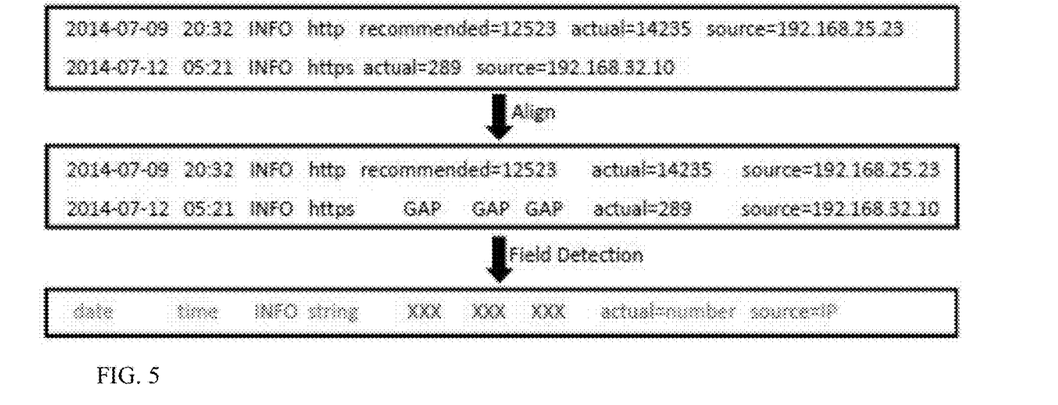
FIG. 5 illustrates an exemplary merging of two patterns.

In 301, a Fast Log Pattern Recognition is performed. After the process clusters the logs in step 301, the process generates a pattern for each cluster. In 301.d., the process applies a merging method. Given two logs to be merged, the process finds their best alignment. The best alignment of two logs is the one that generates minimum number of wildcards and variables after merging. In the alignment process, some gaps may be inserted between the tokens of each log. The alignment algorithm ensures that the lengths of two logs are equal after inserting the gaps. Once two logs with the same length are found, the method processes them token by token and generates the output. An example is shown in FIG. 5 illustrating an exemplary merging of two patterns. One skilled in the art can use various methods for aligning two sequences, one of which is the Smith-Waterman method which can align two sequences of length l1 and l2 in O(l1.l2) time steps. Therefore, the time complexity of the Merge function is also O(l1.l2).

```
Input: Two logs (Log_a, Log_b)
Output: A merged log
Log_a', Log_b' ← Align(Log_a, Log_b)
for i, i = 2, 3,...,|Log_a'| do
    x ← Field_i(Log_a') and y ← Field_i(Log_b')
    if x = y then
        Field_i(Log_new) ← x
    else if Type(x) = Type(y) then
        Field_i(Log_new) ← Variable_Type(x)
    else
        Field_i(Log_new) ← Wildcard
    end if
end for
return Log_new
```

This method is better than UPGMA since UPGMA has a very high time complexity. The reason is that UPGMA tries to find the best order of merging the logs, and follow that specific order to create the final pattern. Our fast and efficient clustering method ensures that logs inside each of the dense clusters are very similar to each other; therefore the order of merging the logs to create the pattern does not matter at all. In order to find the pattern, the system starts from the first log, merges it with the second log, then merges the result with the third log and this is repeated until the last log. The same results can be achieved when the merging is done in reverse or any arbitrary order. Since there is no need to find the best order in this method, it is much faster than the UPGMA.

Figure 6:
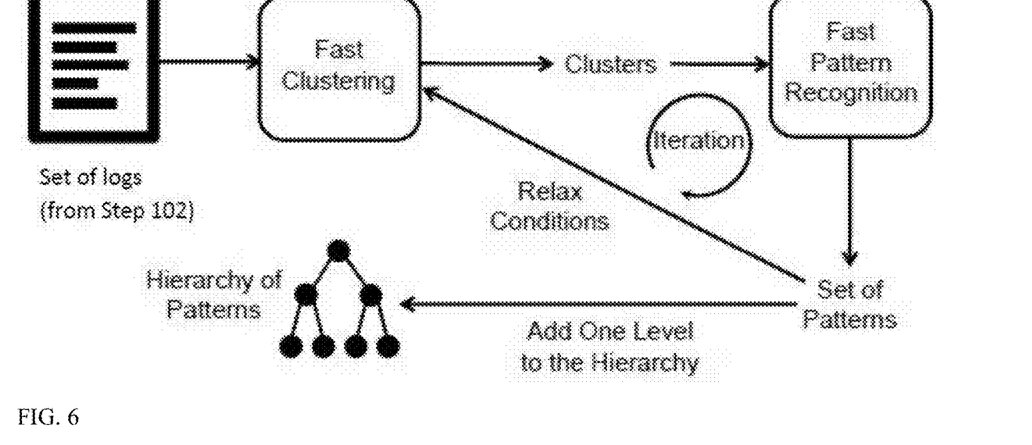
FIG. 6 shows an iterative process with clustering and pattern recognition.
Figure 7:
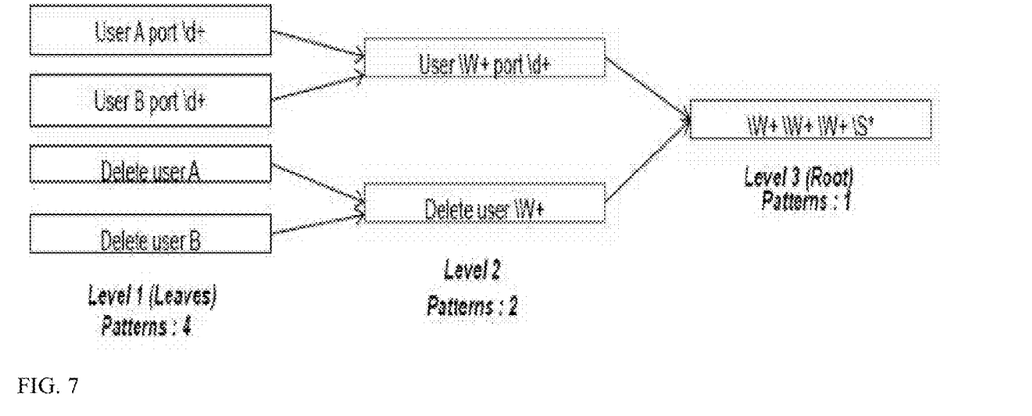
FIG. 7 shows an exemplary pattern tree.

In 302, the process builds a Pattern Hierarchy Tree: In order to create hierarchy, the system uses both fast and efficient clustering (301), and fast pattern recognition (302) in an iterative fashion. FIG. 6 shows this iterative process. A clustering method is applied with a very small MaxDist (i.e, 0.0000001) on the given set of logs. The output of the clustering is a set of dense clusters, where each cluster contains only one single log. Since there is only one log in each cluster, the merging step is not needed, and log itself can serve as a pattern. These patterns are the leaves (lowest level) of the pattern hierarchy tree. The leaf level corresponds to the precise patterns. To generate the other levels of the hierarchy, the MaxDist parameter of the clustering method is increased by a threshold, alpha, which is an internal parameter, and runs it on the patterns generated by the previous value of MaxDist. In other words, a more relaxed version of the clustering method (by using a larger MaxDist) is applied on the patterns which will now produce new clusters. The default value of alpha is set to 0.3, but it can be changed based on user preferences. Pattern recognition is run on all the patterns that are clustered together to find more general patterns. These set of new patterns will be added to the hierarchy as a new level. In each iteration, a new level is added to the hierarchy. This is a bottom-up method to build the pattern-hierarchy. The higher in the hierarchy, the fewer patterns are found, which are more general than the patterns in the lower levels. This structure provides flexibility to choose whatever level of tree as the desired set of patterns. FIG. 7 shows an exemplary pattern tree.

Figure 8:
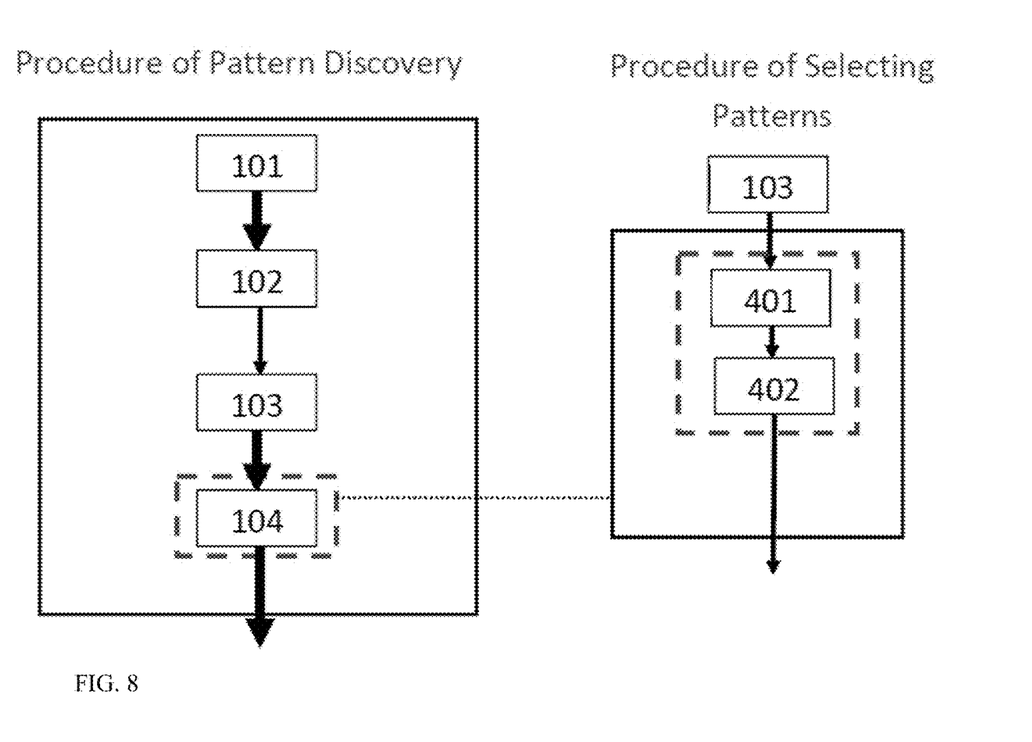
FIG. 8 shows the detail of the pattern selection process.

FIG. 8 shows the detail of the pattern selection process. In 401, given a hierarchy of patterns for a set of logs (from 103), the user may be interested in a level with specific properties. Some users may prefer to get the minimum number of patterns while the others may be interested to get very precise patterns, and may not care about the number of patterns. There are many different criteria that a user can use to select a level, and a general formula to calculate the cost of a level of the hierarchy is as follows:

$$Cost_i = \sum_{i=1}^{\# of\ clusters} Size_i \times (a_1 WC_i + a_2 Var_i + a_3 FV_i)$$

where $Size_i$ is the number of logs in cluster i and $WC_i$, $Var_i$ and $FV_i$ are the number of wildcards, variable tokens and fixed value tokens in the pattern of cluster i respectively. $a_1$, $a_2$ and $a_3$ are tunable parameters that can be set in such a way that thet satisfy user's requirements.

Table 1 shows an example of cost estimation for patterns in FIG. 7.

TABLE 1

Cost Illustration by setting a1 = 1, a2 = 0, and a3 = 0 in FIG. 7.

| Tree Level | Number of Patterns | Cost |
| --- | --- | --- |
| 1 (Leaf) | 4 | 0 |
| 2 (Intermediate) | 2 | 0 |
| 3 (Root) | 1 | 4 |

In 402, if a user has no preferences, by default the process sets $a_1=1$, $a_2=0$, and $a_3=0$ so that the level having no wildcards with minimum number of patterns will be selected as the final set of patterns. For example, For FIG. 7 using Table 1, Level 2 has two patterns with no wildcards, so these two patterns from level 2 are selected as the final set of patterns. A user can also provide his preferences by specifying maximum number of expected patterns. In this case, the process selects the level which contains minimum number of wildcards while not exceeding the expected number of patterns. For example, a user may specify to generate at most 4 patterns. In this case, the process selects two patterns from the Level 2 in FIG. 7 as Table 1 shows that it will generate minimum number of patterns while not exceeding user's maximum pattern limit of 4. From the pattern-tree, user also can choose any specific level. For example, a user may like to select Level 1. In this case, 4 patterns from the Level 1 will be selected as the final pattern-set.

Figure 9:
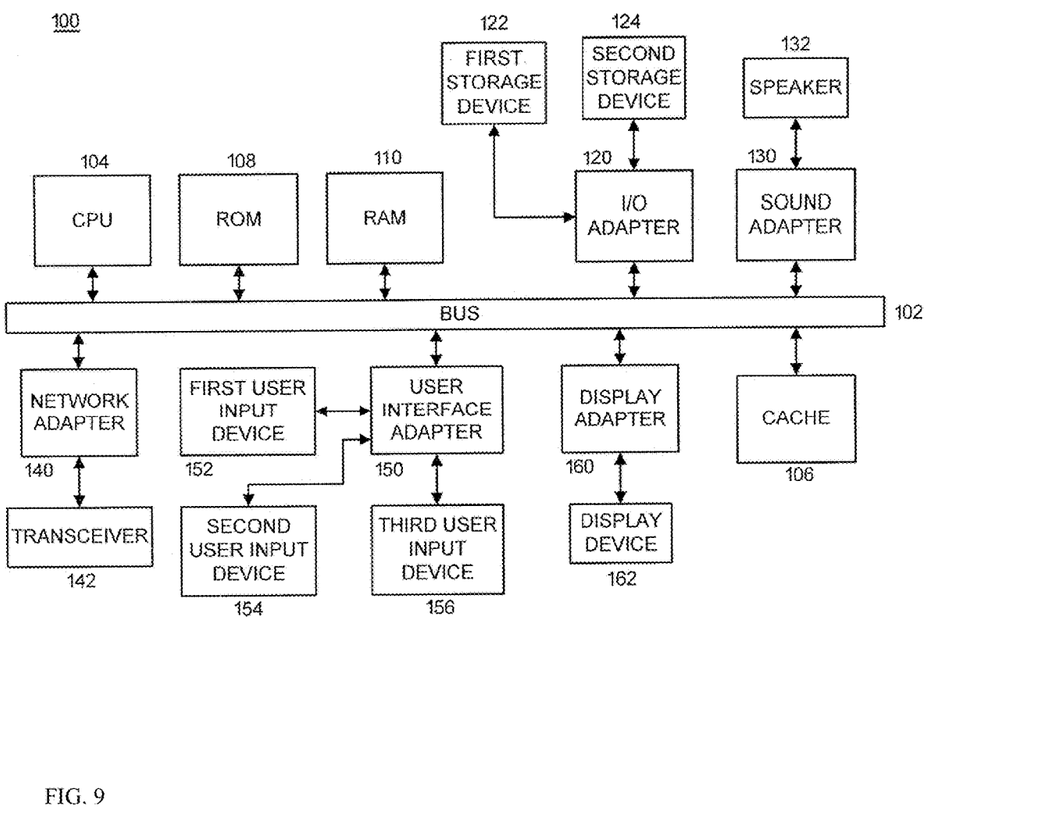
FIG. 9 shows an exemplary block diagram of hardware running the system.

Referring to the drawings in which like numerals represent the same or similar elements and initially to FIG. 9, a block diagram describing an exemplary processing system 100 to which the present principles may be applied is shown, according to an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to a system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to the system bus 102 by the sound adapter 130. A transceiver 142 is operatively coupled to the system bus 102 by a network adapter 140. A display device 162 is operatively coupled to the system bus 102 by a display adapter 160. A first user input device 152, a second user input device 154, and a third user input device 156 are operatively coupled to the system bus 102 by a user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used while maintaining the spirit of the present principles. The user input devices 152, 154, and 156 can be the same type of user input device or different types of user input devices. The user input devices 152, 154, and 156 are used to input and output information to and from the system 100.

Of course, the processing system 100 may also include other elements (not shown), as readily contemplated by one of skill in the art, as well as omit certain elements. For example, various other input devices and/or output devices can be included in the processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations, can also be utilized as readily appreciated by one of ordinary skill in the art. These and other variations of the processing system 100 are readily contemplated by one of ordinary skill in the art given the teachings of the present principles provided herein.

It should be understood that embodiments described herein may be entirely hardware, or may include both hardware and software elements which includes, but is not limited to, firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor, e.g., a hardware processor, coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A computer implemented method for parsing logs from computer systems or computer applications, comprising:
   by the computer
     capturing heterogeneous logs from the systems or applications;
     generating one pattern for every unique log message;
     building a pattern hierarchy tree by grouping patterns based on similarity metrics, and for every group it generates one pattern by combing all constituting patterns of that group; and
     selecting a set of patterns from the pattern hierarchy tree; and
     outputting an indicia of the selected set of patterns;
   wherein for each new log to be processed, the new log is compared to a set of representative logs and one representative log with a similarity distance less than or equal to a predetermined value to the new log is determined;
   wherein the process is abandoned if the similarity distance exceeds the predetermined value;
   wherein the distance between two logs is determined according to the following:

$$Dist(P, Q) = 1 - Sim(P, Q)$$

$$Sim(P, Q) = \sum_{i=1}^{Min(len(P),len(Q))} \frac{Score(P_i, Q_i)}{Max(len(P), len(Q))}$$

$$Score(x, y) = \begin{cases} k_1 & \text{if } x = y \\ 0 & \text{otherwise} \end{cases}$$

wherein P and Q are the two logs, $P_i$ is the i-th token of log P and len(P) is the number of tokens of log P, while $Q_i$ is the i-th token of log Q and len(Q) is the number of tokens of log Q, $k_1$ is a tunable parameter, wherein $k_1=1$ as a default condition.

2. The method of claim 1, comprising logs contain unstructured text content with one or multiple fields and timestamps.

3. The method of claim 1, wherein the pattern-tree comprises leaf level patterns without any wildcard.

4. The method of claim 1, wherein the pattern-tree comprises upper-level patterns with or without wildcards.

5. The method of claim 1, comprising performing tokenization to generate tokens from logs.

6. The method of claim 1, comprising splitting each incoming log based on a set of delimiters and detecting a set of pre-defined data-types including date, time, Internet address, and replacing fields with data-types.

7. The method of claim 1, comprising generating a compact-signature for a log by combining tokens into a single word and generating a unique numeric value for every unique word and of all unique compact signatures.

8. The method of claim 7, wherein every index entry contains a compact-signature as a key and associated metadata as a value and metadata contains log tokens and a counter.

9. The method of claim 1, comprising merging two logs by determining a best alignment for the two logs.

10. The method of claim 1, comprising wherein the Pattern Hierarchy Tree is created using clustering and pattern recognition.

* * * * *